May 5, 1964  H. DERSCHMIDT  3,131,486
ROTORCRAFT TRAINING DEVICE
Filed May 20, 1960  2 Sheets-Sheet 1

Inventor:
Hans Derschmidt
By Stevens Davis Miller & Mosher
Attorneys

May 5, 1964 H. DERSCHMIDT 3,131,486
ROTORCRAFT TRAINING DEVICE
Filed May 20, 1960 2 Sheets-Sheet 2

Inventor:
Hans Derschmidt
By Stevens Davis Miller & Mosher
Attorneys

United States Patent Office 3,131,486
Patented May 5, 1964

3,131,486
ROTORCRAFT TRAINING DEVICE
Hans Derschmidt, Munich, Germany, assignor to Bolkow-Entwicklungen K.G., Ottobrunn, near Munich, Germany
Filed May 20, 1960, Ser. No. 30,483
Claims priority, application Germany May 29, 1959
5 Claims. (Cl. 35—12)

The object of the invention is a training apparatus for the preliminary instruction of helicopter pilots.

The training of helicopter pilots on a machine in flight is expensive because of the high cost of helicopters and because of the complicated handling and the therefore necessarily very long training period. For this reason, less costly trainers of the most diverse types have been developed by means of which it is endeavoured to simulate for the student pilot the sensation of flying and the reaction of the helicopter to his control movements. However, it is difficult for a student pilot to learn at the same time the operation of the controls for the reaction on the six degrees of freedom of the helicopter.

According to the invention, this difficulty is designed to be removed in that in a helicopter trainer the possibilities of movement corresponding to the degrees of freedom of the helicopter can be optionally limited or excluded. Restriction of movement is effected elastically, so that unnecessary shocks or jolting are avoided.

The possibility of vertical movement is limited by an elastic anchoring means which can be so tightly applied that it excludes movement entirely in the extreme case.

According to the invention, lateral movement is prevented in that the helicopter trainer, which is equipped at first with a float for movement of a water surface, is detached from the float and set up at a fixed point together with the guide for vertical movements so as to be rotatable at said fixed point. In the floating apparatus, the capacity for lateral movement can be limited by placing it in a laterally limited tank. An annular ring arranged around the apparatus, for example an inflatable rubber body which serves at the same time to stabilize the apparatus on the water, forms the abutment for limiting the horizontal movement. The ring simultaneously constitutes the means limiting lateral inclination, since it is disposed above the surface of the water in the first place and dips into the water when the apparatus becomes inclined. Being an air-filled body, it has in the water a buoyancy which prevents too great a lateral inclination of the entire apparatus.

When the apparatus is placed on firm ground, the limitation of rotary movement about the vertical axis is effected by means of an externally operated brake which, if desired, may be applied and locked beforehand, so that rotation about the vertical axis is prevented.

Further details will appear from the drawings, in which.

Figure 1:
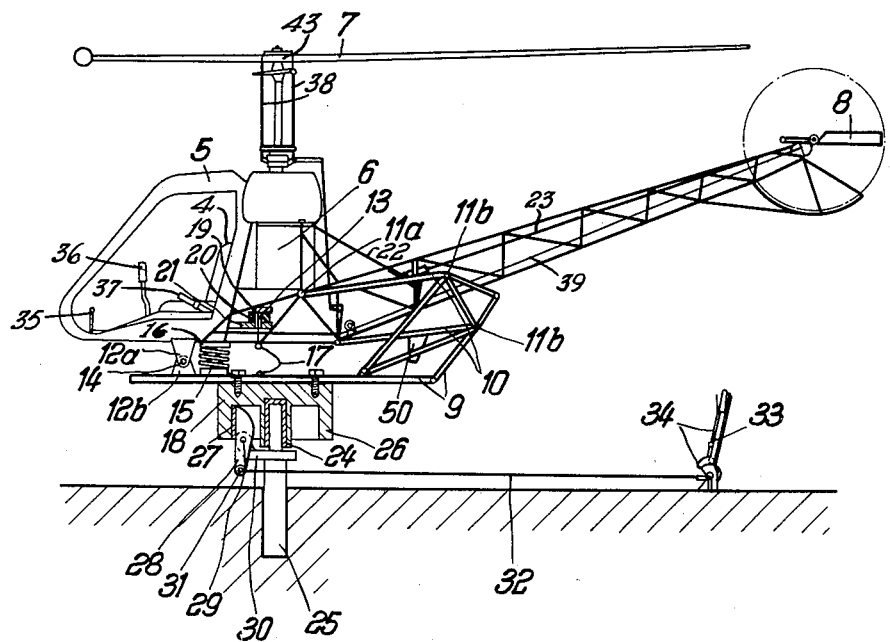
FIG. 1 is a side view of the complete training apparatus, mounted on firm ground.

The helicopter training apparatus consists of the fuselage 5, which is provided with an engine 6, a rotor 7 and a tail rotor 8 and can perform the same functions as a free-flying helicopter. This helicopter assembly is suspended by means of parallel levers 10 so as to be movable vertically, the levers being connected to said assembly at joints 11a and to an underframe 9 at joints 11b. During vertical movements, the helicopter assembly always remains parallel to the underframe 9. A coil spring 15 is mounted on the underframe 9 to limit the downwards movement of the rotary-wing assembly 5 and acts against the abutment 16. Moreover, in order to limit upwards movement, a plate 21 provided with a hollow rubber buffer 20 is mounted on the helicopter assembly, a rod 13 equipped with a cover plate 19 being disposed in the cavity of the hollow buffer. The rod 13 is connected to the underframe 9 by means of a draw cable 17 in order to limit upward vertical movement. For the purpose of completely preventing vertical movement, the assembly has connected to it a bracket 12a and the underframe a bracket 12b. The two brackets can be locked together by means of a locking pin 14. The underframe 9 is secured to a rotary mounting 18 provided with a brake. This rotary mounting 18 is provided at the bottom with a tubular bushing 24, which is mounted on a pivot 25 fixed in the ground. Moreover, the rotary mounting 18 is fitted with a brake drum 26 in which a brake shoe 27 is located. This brake shoe 27 is held and actuated by a lever 28, which is pivotally mounted at a joint 29 on an arm 30 fixedly mounted on the pivot 25. A brake cable 32 is attached at one end to the lower end 31 of the lever 28 and its other end is engaged in an eye of a brake lever 33. The brake lever 33 has a locking device 34 for fixing the brake.

In the vicinity of the seat 4, steering control elements are provided for the pupil pilot. These steering control elements include pedals 35, a control column 36, and a rotor blade pitch adjusting lever 37. All of the steering controls are connected to the existing controls in the usual manner for helicopters. The control column 36 is connected by way of rods 38 to a swash plate 43 of the main rotor 7. The rotor blade pitch adjusting lever 37 is likewise connected to the rods 38. The pedals 35 are connected to the tail rotor 8 through cable lines 39.

The tail rotor is also connected to the engine 6 by a shaft 23 which is driven from the engine 6 through a shaft 22. By reason of these shaft connections, the tail rotor 8 is geared to the main rotor 7 so that there is a constant relationship between the rotary speeds of these two rotors.

Figure 2:
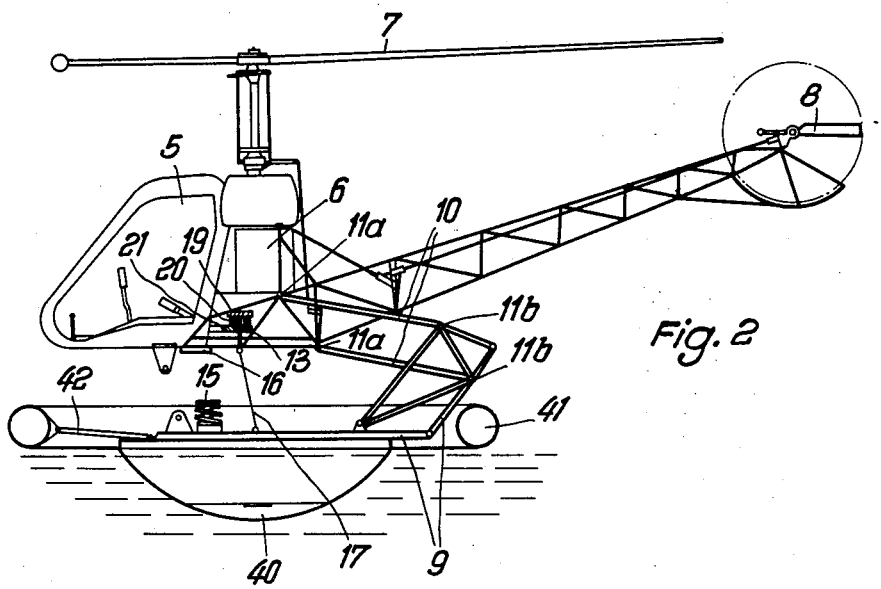
FIG. 2 is a side view of the same apparatus mounted on a float.

In order to be able to simulate horizontal movement, the rotary-wing assembly 5 is removed from the rotary mounting 18 together with the underframe 9 and placed on a float, as shown in FIG. 2. The underframe 9 is screwed fast to the main float 40.

An annular ring 41 is arranged concentrically around the main float, said ring being connected to the main float 40 by means of spokes consisting of tubes 42 which are resistant to bending. The annular ring 41 is advantageously made of rubber-like material which is inflated, so that the roll constitutes a buoyant structure.

The helicopter trainer according to FIG. 1 constitutes an apparatus for the initial primary training of helicopter pilots. By means of this apparatus, every control movement that a helicopter is capable of executing can be imitated restrictedly or without any restriction. Likewise, capacity for movement in some directions can be completely prevented, so that the pupil can learn every control movement by itself.

Rotary movement about the vertical axis is carried out by the rotary mounting 18 turning around the pivot 25 together with the rotorcraft assembly. This rotary movement can be braked at any moment by the flying instructor by actuation of the brake lever 33, which is connected to the brake 26 and 27 by means of the brake cable 32. By engagement of the locking device 34, this movement can also be stopped completely.

Vertical movement of the rotary-wing assembly 5 can be stopped by inserting the locking pin 14 between the brackets 12a and 12b. By removing the pin 14, vertical movement of the rotary-wing assembly is permitted, although it is limited in the downward direction by the coil spring 15. Limitation in the upward direction is obtained by means of the rod 13 and cover plate 19, which are supported against the rubber buffer 20 and the plate 21 mounted fixedly on the rotary-wing assembly 5, the rod being secured to the underframe 9 by the draw cable 17. By lengthening or shortening the draw cable 17, the capacity of the rotary-wing assembly for vertical movement can be adjusted at will.

To learn control about the longitudinal and transverse axes of the helicopter, the student is placed in an apparatus according to FIG. 2. The main float 40 of this apparatus is so designed that the training apparatus is in neutral or lightly stable equilibrium without the action of external forces. On the occurrence of lateral forces, which can be produced by the rotary-wing assembly 5 in the same way as in a real helicopter, the apparatus tilts in the corresponding direction. Any excessive tilting, which could result in overturning, is prevented by the plunging of the annular ring into the water. Owing to the lateral inclination, the apparatus is given a horizontal speed in the direction in which it is inclined by the thrust of the rotor, exactly like a real helicopter. The horizontal acceleration is all the greater the more pronounced the inclination. Limitation of the horizontal movement can be obtained by placing the apparatus in a spatially limited flotation tank, the edge of which provides the annular roll with an abutment at the level of the surface of the water.

Figure 3:
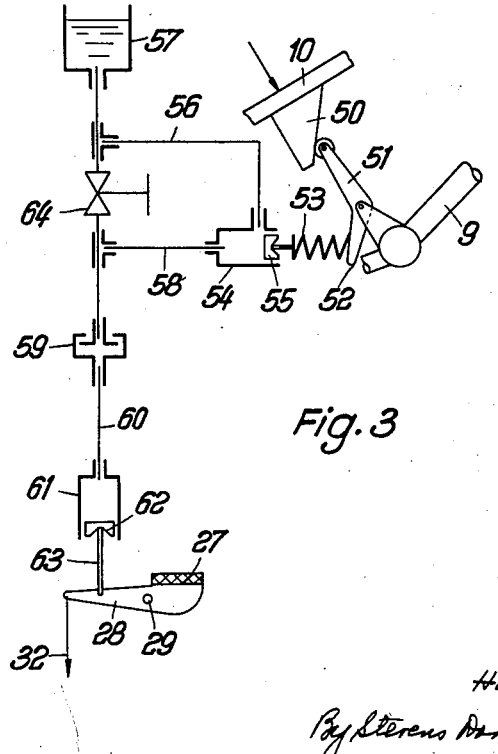
FIG. 3 is a diagrammatic representation of a brake.

FIGURE 3 illustrates in detail an embodiment of a brake. A lug 50 welded to the parallelogram linkage 10 presses on an angle lever 51 pivotally mounted on the underframe 9 when the rotary-wing assembly 5 descends into its basic position shown in FIGURE 1 and swings the angle lever clockwise, as represented in FIGURE 3. In this process, the angle lever 51 presses by means of its lever arm 52 by way of a spring 53 on a piston 55 adapted to be reciprocated in a transmitting cylinder 54. The transmitting cylinder 54 is connected by way of a pipe 56 to a supply reservoir 57 containing brake fluid and by way of a pressure pipe 58 to a rotatable pipe connection 59 arranged on the rotary mounting 18 (see FIGURE 1). The other end of the rotatable pipe connection cooperates by way of a pipe 60 with a receiving cylinder 61. The receiving cylinder 61 likewise has a reciprocable piston 62 which acts by way of a push rod 63 on the double lever 28 co-operating with the brake drum 26. Finally, between the supply reservoir 57 and the pressure pipe 58 there is arranged a valve 64 which, when opened, can render the braking installation inoperative. As the helicopter assembly 5 descends, the double lever 28 is moved counter-clockwise in relation to its pivot point 29 by means of the above-described arrangement and is applied so tightly against the brake drum 26 in the process that all rotary movement of the rotary-wing assembly is prevented. When the rotary-wing assembly 5 takes off from the basic position shown in FIGURE 1, the projection 50 releases the angle lever 51, so that the brake drum 26 is released, and thereby the rotary-wing assembly 5. Thus, if the rotary-wing assembly pivotally mounted on the underframe is in its basic position, the arrangement just described automatically prevents any rotation of the rotary-wing assembly about its vertical axis. The same conditions therefore obtain in the helicopter training apparatus according to the invention as in a real helicopter, which is likewise prevented from rotating about its vertical axis before take-off and after landing, by the skids, which rest on the ground.

I claim:

1. Helicopter training apparatus comprising a helicopter fuselage with a seat, a propulsion unit in said fuselage, a main rotor driven by the propulsion unit, a tail rotor driven by the propulsion unit, control means for influencing the main rotor and the tail rotor, an underframe, a support for the underframe, means connecting the helicopter fuselage to the underframe, means permitting a rotary movement of the underframe and helicopter fuselage with respect to the support about a vertical axis of rotation, and locking means for controlling this rotary movement of the underframe and helicopter fuselage with respect to the support.

2. Helicopter training apparatus comprising a helicopter fuselage with a seat, a propulsion unit in said fuselage, a main rotor driven by the propulsion unit, a tail rotor driven by the propulsion unit, control means for influencing the main rotor and the tail rotor, an underframe, connecting means, including a linkage forming a parallelogram guide, which connecting means connect the helicopter fuselage to the underframe and permit a limited relative vertical movement with respect to the underframe of the helicopter fuselage, a support for the underframe, means for permitting rotary movement about a vertical axis of the underframe and helicopter fuselage with respect to the support, first locking means for controlling the relative vertical movement of the helicopter fuselage with respect to the underframe, and second locking means for controlling the rotary movement of the underframe and helicopter fuselage with respect to the support.

3. Helicopter training apparatus comprising a helicopter fuselage with a seat, a propulsion unit in said fuselage, a main rotor driven by the propulsion unit, a tail rotor driven by the propulsion unit, control means for influencing the main rotor and the tail rotor, and underframe, means connecting the helicopter fuselage to the underframe and permitting a limited relative vertical movement of the helicopter fuselage with respect to the underframe, a fixed support for the underframe underlying the underframe, means for permitting rotary movement about a vertical axis of the underframe and helicopter fuselage with respect to the support, and braking means for automatically preventing any rotation of the apparatus about the vertical axis of rotation when the underframe and helicopter fuselage is located in its lowest position.

4. Helicopter training apparatus comprising a helicopter fuselage with a seat, a propulsion unit in said fuselage, a main rotor driven by the propulsion unit, a tail rotor driven by the propulsion unit, control means for influencing the main rotor and the tail rotor, an underframe, means connecting the helicopter fuselage to the underframe and permitting a limited relative vertical movement of the helicopter fuselage with respect to the underframe, a support for the underframe, means for permitting rotary movement about a vertical axis of the underframe and helicopter fuselage with respect to the support, first locking means for controlling relative vertical movement of the helicopter fuselage with respect to the underframe, second locking means for controlling the rotary movement of the underframe and helicopter fuselage with respect to the support, and braking means for automatically preventing any rotation of the apparatus about the vertical axis of rotation when the helicopter fuselage is located in its lowest position.

5. The helicopter training apparatus of claim 1 wherein the means permitting rotary movement of the underframe and helicopter fuselage is in the form of a brake drum secured to the underside of the underframe and rotatably journaled on the support, and the locking means includes a brake shoe engageable with the brake drum.

References Cited in the file of this patent
UNITED STATES PATENTS

| | | |
|---|---|---|
| 2,885,792 | Hemstreet | May 12, 1959 |
| 2,896,947 | Jacobs | July 18, 1959 |
| 2,916,832 | Hofmann | Dec. 15, 1959 |
| 2,954,614 | Vogt | Oct. 4, 1960 |